United States Patent
Krichever et al.

(10) Patent No.: US 9,228,498 B2
(45) Date of Patent: Jan. 5, 2016

(54) LASER CLAD FUEL INJECTOR PREMIX BARREL

(75) Inventors: Alexander Ilich Krichever, Carlsbad, CA (US); Robert Anthony Corr, II, San Diego, CA (US); Peter Barker, Escindido, CA (US); Bruno Enriquez Struck, San Diego, CA (US); John Preston Montague, San Marcos, CA (US)

(73) Assignee: Solar Turbines Incorporated, San Diego, CA (US)

( * ) Notice: Subject to any disclaimer, the term of this patent is extended or adjusted under 35 U.S.C. 154(b) by 980 days.

(21) Appl. No.: 13/409,103

(22) Filed: Mar. 1, 2012

(65) Prior Publication Data

US 2013/0227951 A1     Sep. 5, 2013

(51) Int. Cl.
| | |
|---|---|
| *F02C 7/22* | (2006.01) |
| *F23R 3/14* | (2006.01) |
| *F23R 3/28* | (2006.01) |

(52) U.S. Cl.
CPC ... *F02C 7/22* (2013.01); *F23R 3/14* (2013.01); *F23R 3/286* (2013.01); *F05D 2230/234* (2013.01); *F23R 2900/00018* (2013.01); *Y10T 29/49323* (2015.01)

(58) Field of Classification Search
CPC .............. F02C 7/22; F02C 7/32; F02C 7/30; F05D 2230/234; F05D 2260/30; F23R 3/286; F23R 3/283; F23R 3/30; F23R 3/32; F23R 3/60; F23R 2900/00017–2900/00019
See application file for complete search history.

(56) References Cited

U.S. PATENT DOCUMENTS

| | | | |
|---|---|---|---|
| 6,056,507 A | 5/2000 | Wheat et al. | |
| 6,883,332 B2 * | 4/2005 | Steinthorsson et al. | ........ 60/776 |
| 7,494,336 B2 | 2/2009 | Barnett | |
| 2002/0046464 A1 | 4/2002 | Kanai | |
| 2006/0286432 A1 * | 12/2006 | Rakowski et al. | .............. 429/38 |
| 2009/0241547 A1 | 10/2009 | Luts et al. | |

(Continued)

FOREIGN PATENT DOCUMENTS

| | | |
|---|---|---|
| CN | 1891392 | 1/2007 |
| CN | 101376971 | 3/2009 |

(Continued)

OTHER PUBLICATIONS

Malin, V., Sciammarella, F., Cladding in Marine Applications Using High-Power Direct-Diode Laser, Welding Journal, Sep. 2008, 10 pages.
Efficient high-power diode laser cladding, Industrial Laser Solutions for Manufacturing, Aug. 1, 2009, 6 pages.
Solidification and microstrucral aspects of laser-deposited Ni—Mo—Cr—Si alloy on stainless steel, Pramana—Journal of Physics, vol. 75, No. 6, Dec. 2010, pp. 1259-1266.

*Primary Examiner* — Andrew Nguyen
(74) *Attorney, Agent, or Firm* — Finnegan, Henderson, Farabow, Garrett & Dunner, LLP

(57) ABSTRACT

A fuel injector for a gas turbine engine may include a center body disposed about a longitudinal axis, and a premix barrel positioned radially outwardly from the center body to define an annular passageway between the center body and the premix barrel. The annular passageway may extend from an upstream end that is configured to be fluidly coupled to a compressor to a downstream end that is configured to be fluidly coupled to a combustor. The premix barrel may include a first portion at the upstream end and a second portion at the downstream end. The first portion may include a stainless steel material, and the second portion may include a nickel based superalloy material. The second portion may be coupled to the first portion by a laser clad coupling.

10 Claims, 4 Drawing Sheets

(56) References Cited

U.S. PATENT DOCUMENTS

| | | | |
|---|---|---|---|
| 2009/0255259 A1 | 10/2009 | Kastrup et al. | |
| 2010/0025382 A1* | 2/2010 | Kottilingam et al. | 219/75 |
| 2010/0064690 A1* | 3/2010 | Bailey et al. | 60/734 |
| 2010/0071373 A1* | 3/2010 | Martin et al. | 60/734 |
| 2010/0218501 A1 | 9/2010 | York et al. | |
| 2010/0263383 A1 | 10/2010 | York et al. | |
| 2010/0293955 A1* | 11/2010 | Berry et al. | 60/742 |
| 2010/0313569 A1* | 12/2010 | Boardman et al. | 60/737 |
| 2010/0319350 A1* | 12/2010 | Landry et al. | 60/748 |
| 2011/0057056 A1 | 3/2011 | Ziminsky et al. | |
| 2011/0107764 A1* | 5/2011 | Bailey et al. | 60/737 |

FOREIGN PATENT DOCUMENTS

| | | |
|---|---|---|
| EP | 2030718 | 3/2009 |
| JP | H0976038 | 3/1997 |
| WO | 0112381 | 2/2001 |
| WO | 2009126404 | 3/2012 |

* cited by examiner

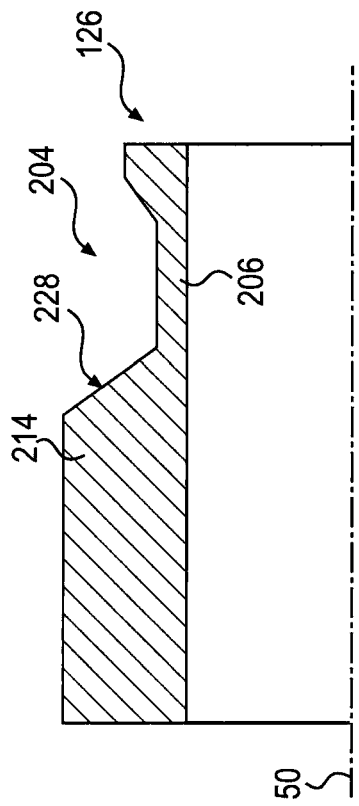
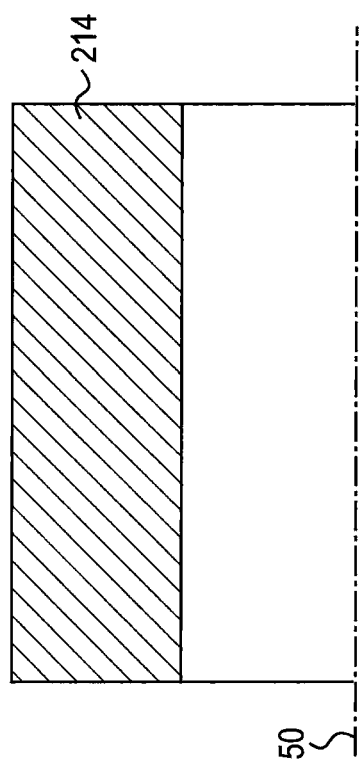
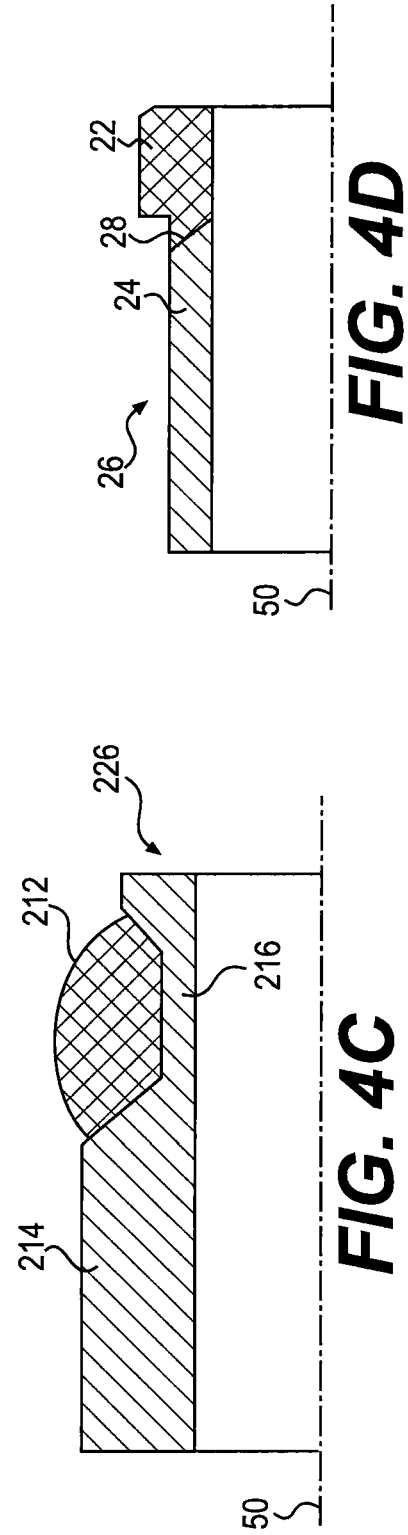
FIG. 4A
FIG. 4B
FIG. 4C
FIG. 4D

LASER CLAD FUEL INJECTOR PREMIX BARREL

TECHNICAL FIELD

The present disclosure relates generally to a premix barrel of a gas turbine fuel injector, and methods of making the premix barrel by laser cladding.

BACKGROUND

In a typical gas turbine engine, one or more fuel injectors direct a fuel to a combustion chamber (called a combustor) for combustion. The fuel burns in the combustor producing heat. In some applications, the temperature in the combustor can reach as high as about 1800° F. The components of the fuel injector that are coupled to (or proximate to) the combustor are exposed to these high temperatures. To minimize temperature related damage, such components are typically made of alloys that have high creep resistance and mechanical strength. However, such alloys are expensive, and can increase the cost of these components.

U.S. Pat. No. 6,056,507 describes a gas turbine engine turbine blade assembly with a nickel based superalloy blade tip attached to a steel body by brazing. In the '507 patent, the cost of the assembly is reduced by using the more expensive superalloy only at regions where they are needed.

SUMMARY

In one aspect, a fuel injector for a gas turbine engine is disclosed. The fuel injector may include a center body disposed about a longitudinal axis, and a premix barrel positioned radially outwardly from the center body to define an annular passageway between the center body and the premix barrel. The annular passageway may extend from an upstream end that is configured to be fluidly coupled to a compressor to a downstream end that is configured to be fluidly coupled to a combustor. The premix barrel may include a first portion at the upstream end and a second portion at the downstream end. The first portion may include a stainless steel material, and the second portion may include a nickel based superalloy material. The second portion may be coupled to the first portion by a laser clad coupling.

In another aspect, a method of fabricating a premix barrel of a gas turbine fuel injector is disclosed. The method may include machining an annular groove on a tubular component extending along a longitudinal axis, and depositing a cladding on the groove using laser cladding. The method may also include machining the cladded tubular component to a form the premix barrel. The premix barrel may include the cladding extending as a hollow tube along the longitudinal axis from one end of the tubular component.

In another aspect, a method of fabricating a premix barrel of a gas turbine fuel injector is disclosed. The method may include creating an annular groove along a length of a tubular component, and depositing a cladding on the groove using laser cladding. The method may also include machining the cladded tubular component to form the premix barrel. The machining may include removing at least a portion of the tubular component below the deposited cladding to expose a bottom surface of the cladding.

In yet another aspect, a premix barrel for a fuel injector of a gas turbine engine is disclosed. The premix barrel may include a substantially tubular body extending along a longitudinal axis from a first end to a second end. The tubular body may include a first portion made of a first material proximate the first end, and a second portion made of a second material proximate the second end. The first portion may have a first inner diameter and a first outer diameter, and the second portion may have a second inner diameter and second outer diameter. The second portion may be coupled to the first portion by a laser clad coupling.

BRIEF DESCRIPTION OF THE DRAWINGS

FIGS. 4A-4D are schematic illustrations that illustrate the steps in the method of FIG. 3.

DETAILED DESCRIPTION

Figure 1:
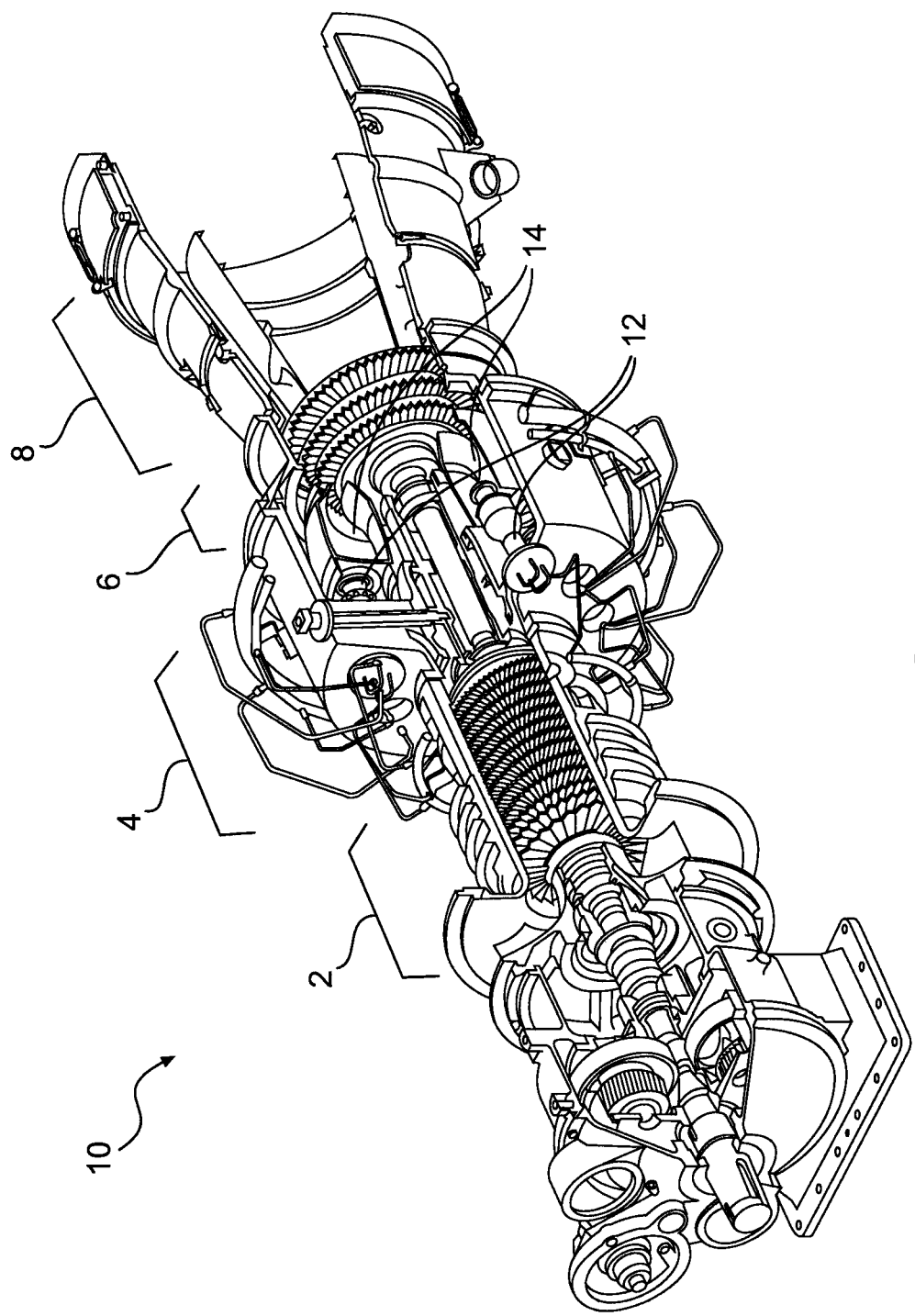
FIG. 1 is a cutaway-view illustration of an exemplary disclosed turbine engine.

FIG. 1 illustrates an exemplary gas turbine engine 10 that may be used in any application. Turbine engine 10 may include a compressor section 2, a combustor section 4, a turbine section 6, and an exhaust section 8. Combustor section 4 includes one or more fuel injectors 12 that mix a fuel with compressed air, and direct the fuel-air mixture to a combustor 14 for combustion. Combustion of the fuel-air mixture produces combustion gases at a high pressure and temperature. These combustion gases are directed to the turbine section 6 which extracts energy from these combustion gases, and directs the spent exhaust gases to the atmosphere through the exhaust section 8. Combustion of the fuel-air mixture in the combustor 14 heats the walls of the combustor 14 and components that are coupled thereto.

Figure 2:
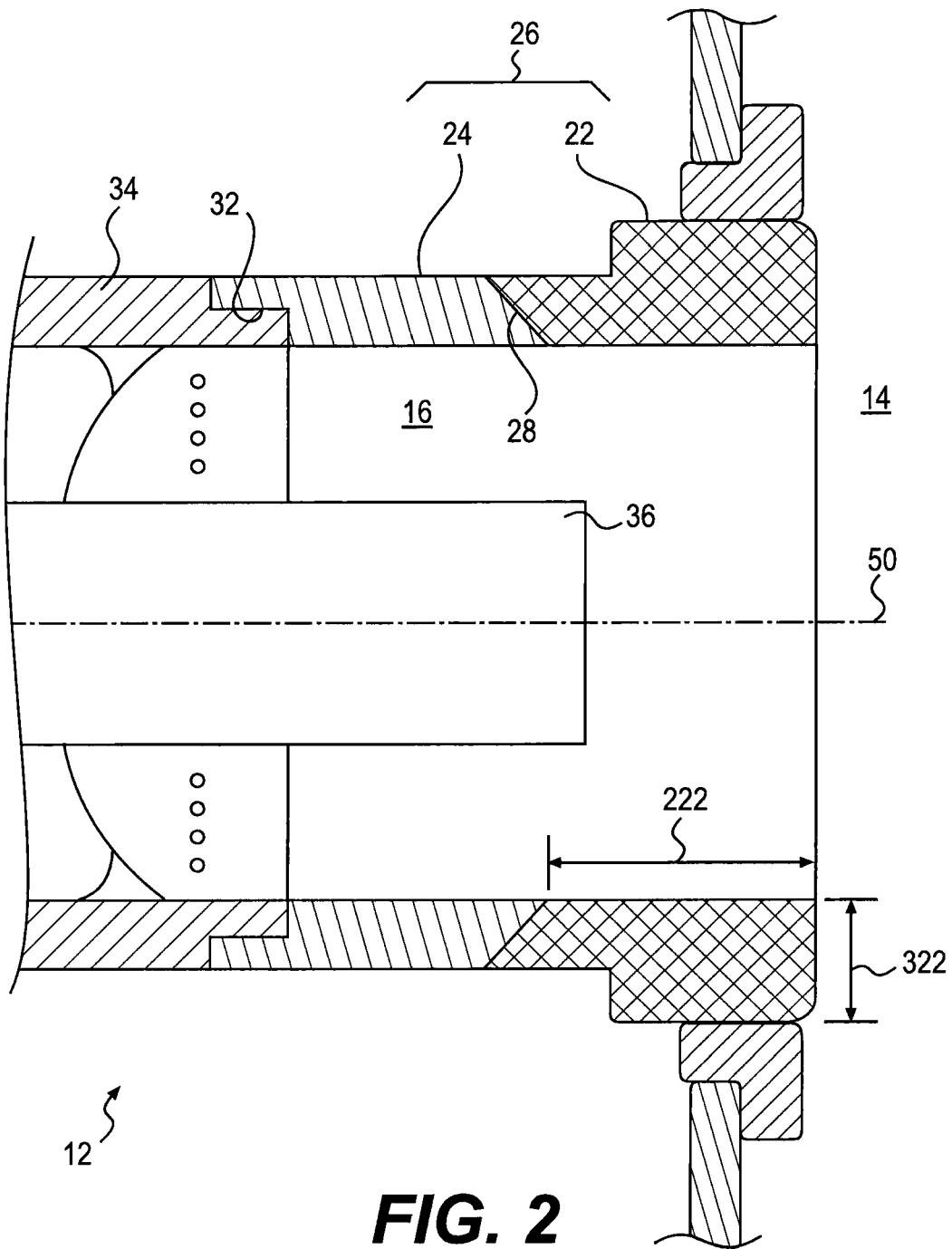
FIG. 2 is a cross-sectional illustration of a portion of an exemplary fuel injector of the turbine engine of FIG. 1.

FIG. 2 illustrates a cross-sectional view of a portion of an exemplary fuel injector 12 coupled to combustor 14 of turbine engine 10. Fuel injector 12 includes a premix barrel 26 having a downstream end (or a front portion 22) coupled to the combustor 14. In general, premix barrel 26 may have any shape and configuration. In some embodiments, the premix barrel 26 may be generally cylindrical, and have a substantially tubular configuration extending along a longitudinal axis 50. The front portion 22 of the premix barrel 26 may be coupled to the combustor 14 by any known method. In some embodiments, the front portion 22 may be coupled to the combustor 14 such that relative motion between the premix barrel 26 and the combustor wall is permitted (for example, to accommodate dimensional changes due to thermal expansion). It is also contemplated that, in some embodiments, the front portion 22 may be directly connected to a wall of the combustor 14.

Fuel injector 12 may include a center body 36 located radially inwards of premix barrel 26 to define an annular duct 16 therebetween. The premix barrel 26 may direct the fuel-air mixture to the combustor 14 through the annular duct 16. The fuel-air mixture may be directed into the premix barrel 26 through an air swirler 34 positioned upstream of the premix barrel 26. In some embodiments, an upstream end (or a rear portion 24) of the premix barrel 26 may be connected to the air swirler 34 using a brazed joint 32. The air swirler 34 may include an annulus with a plurality of vanes connected thereto. The vanes may be configured to induce a rotational component of velocity to the fuel-air mixture passing therethrough. In some embodiments, the air swirler 34 may include fuel outlets (orifices, nozzles, spokes, etc.) that inject the fuel (any liquid or gaseous fuel) into a compressed air stream passing through the vanes to create a swirled fuel-air mixture. In some applications, the center body 36 may house a pilot assembly configured to direct a separate stream of fuel and air to the combustor 14. The fuel-air mixture entering the combustor 14 through the annular duct 16, and the fuel stream entering the combustor 14 through the center body 36 ignite and burn in the combustor 14.

The combustion in combustor 14 heats the front portion 22 of the premix barrel 26. In some embodiments, the premix barrel 26 may expand in response to the heating and scrape against the combustor wall. This scraping may induce mechanical wear on the outer surface of the front portion 22. To withstand the high temperatures in the combustor 14 and the mechanical wear, the front portion 22 may be made from a material capable of withstanding these environmental conditions. In some embodiments, an alloy such as, for example, a nickel based superalloy, may be selected for the front portion 22. In some embodiments, the nickel based superalloy may include Alloy-X (Alloy-230, Alloy-118, etc.). The rear portion 24 of the premix barrel 26, that is in contact with relative cooler fuel-air mixture, may be cooler than, and subject to less adverse conditions than, the front portion 22. Therefore, the rear portion 24 may be made of a different material, such as stainless steel (for example, AMS 5653, ASTM A-479, etc.). For increased strength of the premix barrel 26 (and therefore, increased reliability of the fuel injector 12), the front portion 22 of the premix barrel 26 may be laser clad on, or grown on, the rear portion 24.

The front portion 22 may have a length 222 and thickness 322. The length 222 and thickness 322 may depend upon the application (for example, the operating conditions and size of the gas turbine engine 10). In general, the length 222 of the front portion 22 may vary from about 0.5-2.5 inches (12.7-63.5 mm), and the thickness 322 may vary from about 0.15-0.5 inches (3.81-12.7 mm). In some embodiments, length 222 may vary from about 0.75-1.5 inches (19.05-38.1 mm), and the thickness 322 may vary from about 0.2-0.5 inches (5.08-12.7 mm). In this specification, the term "about" is used to indicate a variation of 10% of a value. For instance, a length of about 0.2 inches, indicates a length between 0.18-0.22 inches (4.57-5.59 mm).

Laser cladding the front portion 22 on the rear portion 24 creates a premix barrel 26 in which the front portion 22 is coupled to the rear portion 24 by laser clad coupling. In such a coupling, the front portion 22 may be coupled to the rear portion 24 without an adhesive material (or another interfacial material) between them. Laser cladding the front portion 22 on the rear portion 24 involves only localized heating at the interface 28, therefore, dilution of the materials (of the front and rear portions 22, 24) and alloy formation at the interface 28 will be minimal. Laser cladding the front portion 22 on the rear portion 24 (that is, laser clad coupling) is characterized by an interface 28 where material properties change relatively abruptly across the interface 28. For example, hardness measurements along a horizontal line across interface 28 will indicate a relatively sharp change in hardness across interface 28.

It should be noted that although a premix barrel 26 of a gas turbine engine fuel injector 12 is described herein, this is only exemplary. In general, a front portion 22 of one material may be laser clad on a rear portion 24 of a different material, and used as a component in any application. For example, in an application where a front portion 22 of a bearing is subject to increased wear as compared to its rear portion 24, a front portion 22 of a wear resistant material may be laser clad on a rear portion 24 of a different material in the bearing.

An exemplary method of laser cladding the front portion 22 on the rear portion 24 is described in the following section.

INDUSTRIAL APPLICABILITY

The disclosed laser clad premix barrel may be applied to any fuel injector to increase the temperature resistance of the premix barrel without increasing its cost. Since a heat resistant material is laser clad to the premix barrel, the strength and reliability of the premix barrel may be high. An exemplary method of laser cladding a heat resistant front portion on a stainless steel rear portion is described below.

Figure 3:
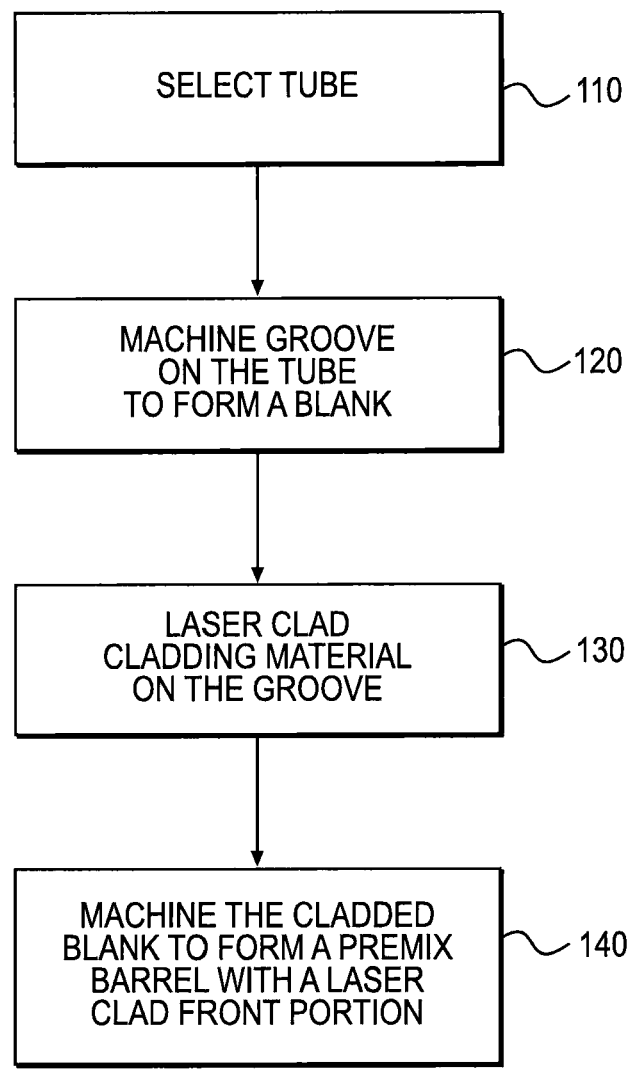
FIG. 3 is a flow chart illustrating a method of making a premix barrel of the fuel injector of FIG. 1.

FIG. 3 is a flow chart that illustrates an exemplary method 100 of laser cladding the front portion 22 on the rear portion 24 of premix barrel 26. FIGS. 4A-4D are schematic illustrations that illustrate, in a step-by-step manner, the formation of the laser clad premix barrel 26 by the exemplary method 100. A tube 214, made of the material of the rear portion 24, is selected (step 110), and if required, machined to a desired size. As described previously with reference to the rear portion 24, a tube 214 made of any stainless steel material may be selected. A groove 204 is then machined proximate one end of the tube 214 to form a blank 126 (step 120). Any machining process known in the art may be used to form the blank 126. For example, in some embodiments, the tube 214 may be rotated about its longitudinal axis 50 in a lathe, and material from a selected region of the tube 214 removed using a suitable machining tool. The groove 204 may have any desired shape and size. For example, in some embodiments, the groove 204 may include an inclined side wall 228. After machining (that is, step 120), the tube 214 may include a base 206 of a reduced thickness at the root of the groove 204. The blank 126 is rotated, and a cladding 212 of the front portion 22 material may be laser cladded on the groove 204 (step 130). For example, if a premix barrel 26 with a stainless steel (AMS 5659) rear portion 24 and an Alloy-230 front portion 22 is desired, a tube 214 of stainless steel (AMS 5659) is machined to form a blank 126 with a groove 204, and a cladding 212 of Alloy-230 is laser clad on the groove 204.

Laser cladding is a process in which a feed stock of cladding material (in the form of a wire, powder, etc.) is applied to the groove 204. And, a concentrated laser beam is used to melt the applied feed stock and a thin layer of material at the base of the groove 204, to form a cladding 212 that is metallurgically bonded to the base of the groove 204. Since the blank 126 is rotated during laser cladding, the cladding 212 is formed evenly around the groove 204. Laser cladding is similar to thermal spraying in that an energy source is used to melt the feed stock that is being applied to a substrate. However, unlike thermal spraying, laser cladding also melts a thin layer of the substrate that the feed stock is being applied to. This melting results in a strong metallurgical bond between the cladding 212 and the base 206. Typically, laser cladding results in an interface with a superior bond strength over thermal spraying. Since a concentrated laser beam is used as the heat source, the heat affected zone in the base 206 will be a minimum. Since laser cladding processes are known in the art, the steps involved in laser cladding are not described herein. Any known laser cladding process may be used to deposit the cladding 212. The cladding 212 may be of any shape and thickness that will produce a front portion 22 having the desired dimensions (for example, length 222 and thickness 322, see FIG. 2). In some embodiments, the thickness of the deposited cladding 212 may be greater than a thickness of the base 206 below the deposited cladding 212.

After cladding, the cladded blank 226 is machined to form the premix barrel 26 having the desired final shape and size (step 140). The machining operation may remove the base 206 at the base of the cladding 212, to form a free standing front portion 22 made of the cladding 212 material connected to the rear portion 24 at interface 28. The inclined interface 28 may increase the area of contact between the front portion 22 and the rear portion 24, and therefore, increase the strength of the interface 28. In some embodiments, the interface 28 may have other shapes. For example, in some embodiments, the interface 28 may be stepped, and in some embodiments the interface 28 may be vertical. Since the base 206 on which the cladding 216 is deposited is removed by machining after deposition, any detrimental effects of the laser cladding process on the premix barrel 26 will be minimized. The machining operation may also form other desired features of the premix barrel 26. For example, an outer diameter of the front portion 22 may be machined to be greater than an outer diameter of the rear portion 24, an inner diameter of the front portion 22 may be machined to be substantially the same as an inner diameter of the rear portion 24, and the free end of the front portion 22 may be machined to include a chamfer.

Since the laser clad portion is metallurgically bonded to the underlying substrate, the interface between them may be strong. Additionally since the laser cladding process minimizes the heat affected zone in the underlying substrate, and since the base 206 is removed after cladding, any negative effect of the laser cladding process on the underlying substrate may be minimal. Although a cladded premix barrel 26 of a fuel injector 12, and an exemplary method of cladding the premix barrel 26 are described herein, this is only exemplary. In general, the described methods may be applied to laser clad a portion of any component used in any application.

It will be apparent to those skilled in the art that various modifications and variations can be made to the disclosed laser clad premix barrel for a fuel injector. Other embodiments will be apparent to those skilled in the art from consideration of the specification and practice of the disclosed premix barrel. It is intended that the specification and examples be considered as exemplary only, with a true scope being indicated by the following claims and their equivalents.

What is claimed is:

1. A fuel injector for a gas turbine engine, comprising:
a center body disposed about a longitudinal axis; and
a premix barrel positioned radially outwardly from the center body to define an annular passageway therebetween, the annular passageway extending from an upstream end configured to be fluidly coupled to a compressor of the turbine engine to a downstream end configured to be fluidly coupled to a combustor of the turbine engine, the premix barrel including:
a first portion at the upstream end, the first portion including a stainless steel material; and
a second portion at the downstream end, the second portion including a nickel based superalloy material, the second portion being grown on the first portion by laser cladding feed stock of the nickel based superalloy material over an inclined wall of the first portion, wherein the inclined wall of the first portion forms an acute angle with the longitudinal axis.

2. The fuel injector of claim 1, wherein the second portion of the premix barrel has a length between about 0.5-2.5 inches and a thickness between about 0.15-0.5 inches.

3. The fuel injector of claim 2, wherein the length is between about 0.75-1.5 inches and the thickness is between about 0.2-0.5 inches.

4. The fuel injector of claim 1, wherein the nickel based superalloy material is Alloy-X.

5. The fuel injector of claim 1, wherein the second portion is configured to be coupled to the combustor, and the first portion is brazed to an air swirler of the fuel injector.

6. A fuel injector of a gas turbine engine, comprising:
a substantially tubular body extending along a longitudinal axis from a first end to a second end, the tubular body including;
a first portion made of a first material proximate the first end, the first portion having a first inner diameter and a first outer diameter; and
a second portion made of a second material proximate the second end, the second portion having a second inner diameter and second outer diameter, wherein the second portion is grown on the first portion by laser cladding feed stock of the second material over an inclined wall of the first portion, wherein the inclined wall of the first portion forms an acute angle with the longitudinal axis.

7. The fuel injector of claim 6, wherein the first inner diameter is substantially equal to the second inner diameter.

8. The fuel injector of claim 7, wherein the second outer diameter is larger than the first outer diameter.

9. The fuel injector of claim 6, wherein an interface between the first portion and the second portion is inclined.

10. The fuel injector of claim 6, wherein the first portion includes stainless steel and the second portion includes a nickel based superalloy.

* * * * *